N. R. WHITE.
MUD CHAIN.
APPLICATION FILED AUG. 31, 1920.
1,390,411.  Patented Sept. 13, 1921.
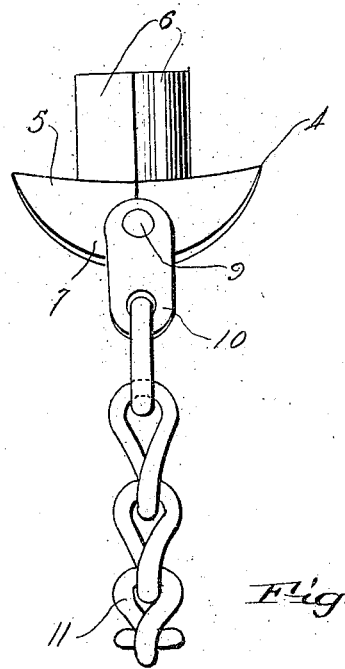
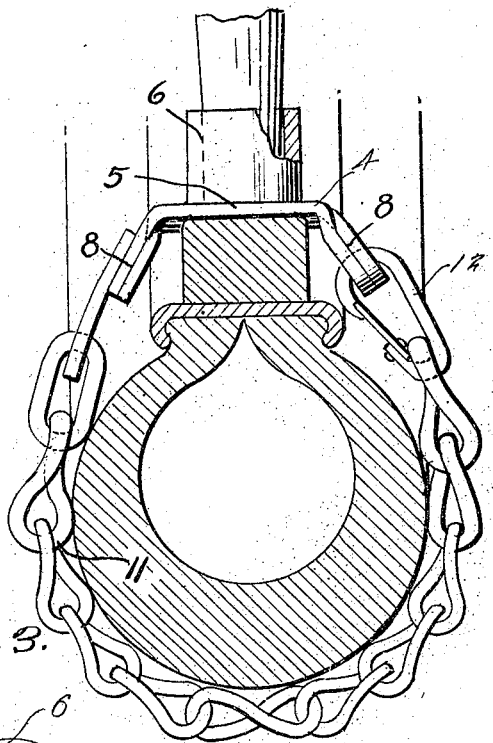
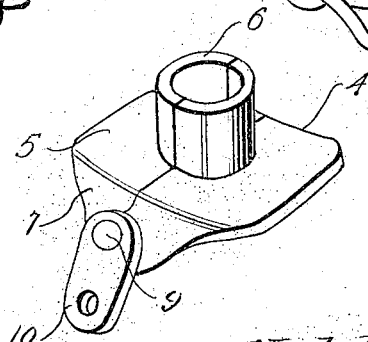
Noah R. White — INVENTOR
BY
Richard B. Owen
ATTORNEY
WITNESSES

UNITED STATES PATENT OFFICE.

NOAH R. WHITE, OF DELTA, COLORADO.

MUD-CHAIN.

1,390,411.  Specification of Letters Patent.  Patented Sept. 13, 1921.

Application filed August 31, 1920. Serial No. 407,129.

*To all whom it may concern:*

Be it known that I, NOAH R. WHITE, a citizen of the United States, residing at Delta, in the county of Delta and State of Colorado, have invented certain new and useful Improvements in Mud-Chains, of which the following is a specification.

This invention relates to mud chains especially adapted for use on motor vehicles.

An object of the invention is to provide a chain which may be quickly attached to a wheel to improve traction of the vehicle, especially on muddy or snowy thoroughfares, likewise preventing skidding of the vehicle.

A further object of the invention is to provide a chain which will be fixedly anchored on the wheel preventing its casual displacement at the same time minimizing possibility of the wheel being disfigured by movement of the chain during rotation of the wheel.

The above and other objects of this invention will be in part described and in part understood from the following description of the present preferred embodiment of the invention taken in connection with the accompanying drawings, wherein:

Figure 1, is an end elevational view of a device constructed in accordance with my invention.

Fig. 2, is a side elevational view of the device illustrating its application, and Fig. 3, is a perspective view of the spoke embracing member.

The device of my invention consists of a spoke embracing member generally designated 4 and consisting of a two-part structure. Each part comprises a base plate 5 which has upstanding from the inner marginal edge thereof a semi-cylindrical portion 6, so that when the parts are engaged a cylindrical collar is provided for engagement with the spoke of the vehicle. The lateral margins of each of the base plates are reduced and bent downwardly as indicated at 7 to snugly embrace the sides of the wheel felly. The terminals of the plates overlap as indicated at 8 and shown to advantage in Fig. 2. The ends at one side of the spoke embracing collar are pivotally connected by a bolt 9, the latter likewise serving to connect a link 10 to the ends of said plates.

The opposite end of said link is engaged with one end of a chain 11, the opposite end of the latter carrying a snap-hook 12, which is adapted for engagement with alined openings formed in the ends of said plates 5 diametrically opposite from the openings through which the bolt 9 extends. In this way the spoke embracing member may be locked into engagement with the spoke.

In use of this device, the snap-hook 12 is disengaged from the plates 5 and the latter swung open upon the pivot bolt 9, following which the semi-cylindrical members 6 are engaged with the spoke and the plates 5 engaged with the top and sides of the wheel felly. The chain 11 extends around the tire and when the snap hook 12 is engaged with the plates 5, as shown in Fig. 2, it will be apparent that displacement of the same is prevented. It is, of course, to be understood that the terminal link of the chain which engages the flat link 10 may be opened. Moreover, additional links may be readily engaged with the opposite terminal link of the chain which engages the snap-hook 12. It is moreover apparent that this device may be quickly attached to or detached from the wheel and will greatly aid in the traction of the vehicle as well as preventing slippage of the latter.

What is claimed is:

A mud chain for vehicle wheels including a pair of plates, each consisting of a base to engage the wheel felly and an upstanding semi-cylindrical portion to embrace the spoke of the wheel, means pivotally connecting the plates at one end, and a chain engaged with said means and extended around the tire of the wheel into engagement with the opposite ends of said plates to detachably engage the latter with the wheel spoke.

In testimony whereof I affix my signature in presence of two witnesses.

NOAH R. WHITE.

Witnesses:
 FRANK P. MCKEE,
 WM. FAIRCLOTH.